United States Patent [19]

Amir et al.

[11] Patent Number: 4,982,139
[45] Date of Patent: Jan. 1, 1991

[54] METHOD AND APPARATUS FOR CONTROLLING LIGHT INTENSITY

[75] Inventors: Israel Amir, Ewing; Richard S. Armington, Trenton; Barry Weissman, Hightstown, all of N.J.

[73] Assignee: AT&T Bell Laboratories, Murray Hill, N.J.

[21] Appl. No.: 332,315

[22] Filed: Apr. 3, 1989

[51] Int. Cl.$^5$ .................... H05B 37/02; H05B 39/04
[52] U.S. Cl. .................... 315/151; 315/158; 315/311
[58] Field of Search ............ 250/205; 315/151, 150, 315/149, 158, 307, 311, 205

[56] References Cited

U.S. PATENT DOCUMENTS

| | | | |
|---|---|---|---|
| 3,996,494 | 12/1976 | Suga | 315/151 |
| 4,008,390 | 2/1977 | Runge | 250/205 |
| 4,155,005 | 5/1979 | Knowlton et al. | 250/205 |
| 4,254,364 | 3/1981 | Flint et al. | 315/151 X |

OTHER PUBLICATIONS

Fostec, Inc., Preliminary Product Bulletins, Nos. 501, The Light Sources, and 509, The Lightsource Mounting Brackets and Replacement Lamps (02/15/89).

*Primary Examiner*—Eugene R. LaRoche
*Assistant Examiner*—Ali Neyzari
*Attorney, Agent, or Firm*—Robert B. Levy

[57] ABSTRACT

The present invention is directed to an illumination source (10) for illuminating an object (11) with light (16) of substantially constant intensity. The illumination source includes an electric light bulb (12) which is supplied with voltage from an adjustable-voltage power supply (14). The voltage supplied by the power supply (14) varies in accordance with the intensity of the light (16) radiated from the bulb (12), as sensed by a photodiode (24). The photodiode (24) is separated from the bulb by a length of lightguide fiber (26) into which light from the bulb is coupled by a glass rod (28). The fiber (26) and the rod (28) allow the photodiode (24) to be supplied with light from the bulb (12), yet to be thermally insulated therefrom, so as to avoid thermal run-away of the diode.

9 Claims, 2 Drawing Sheets

METHOD AND APPARATUS FOR CONTROLLING LIGHT INTENSITY

TECHNICAL FIELD

This invention relates to a method and apparatus for illuminating an object with light of substantially constant intensity.

BACKGROUND OF THE INVENTION

There is presently a trend in manufacturing towards achieving increased product velocity in order to reduce work-in-process, and hence, manufacturing costs. As product velocities increase, visual product inspection by an operator to detect defects, after one or more fabrication operations are performed, becomes increasingly difficult. The need to achieve accurate product inspection rapidly, on a repeated basis, has led to the development of machine vision inspection systems. Such systems typically incorporate an image-acquisition device, in the form of a television camera or the like, and a vision processor, usually a microprocessor, programmed to process the output signal of the camera to obtain the image of the product being inspected. The image of the product is processed by the microprocessor to detect whether there are any visual defects which might render the product defective.

In most manufacturing facilities, the ambient lighting is often of insufficient intensity and is not structured to enable the camera of the machine vision system to obtain a high contrast image of the product undergoing inspection. Therefore, most vision inspection systems incorporate one or more separate illuminators for illuminating the product undergoing inspection. In many instances, a fiber optic illuminator is employed for this purpose. The typical fiber optic illuminator comprises an electric light bulb, often fabricated together with a mirror or integral reflector, which serves to reflect the light radiated by the bulb into a length of lightguide fiber which carries light to the product. In some instances, associated optics may be provided to focus the light reflected by the mirror into the fiber.

With present day fiber optic illuminators, the light bulb is energized from a voltage supply powered from an AC line. Fluctuations in the AC line voltage, which are common in most industrial environments, will cause variations in the intensity of the light radiated by the light bulb. Even small variations in the intensity of the light from the light bulb of the fiber optic illuminator can adversely affect the image of the product captured by the camera of the vision inspection system, and hence the accuracy of inspection. Further, as the electric light bulb of the illuminator ages, the intensity of the light radiated by the light bulb also changes, which can also affect the accuracy of product inspection.

Therefore, there is a need for a technique for illuminating a product undergoing inspection with light of substantially constant intensity, notwithstanding variations in line voltage and the effects of light bulb aging.

SUMMARY OF THE INVENTION

Briefly, in accordance with a preferred embodiment of the invention, a technique is provided for illuminating an object with light of substantially constant intensity. Such constant intensity illumination is achieved by supplying voltage from an adjustable voltage power supply to an electric lamp whose radiated light is substantially directed into one end of a length of lightguide fiber for transmission to the object which is to be illuminated. At least a portion of the stray light radiated by the light bulb, that is, the light not otherwise coupled into the fiber, is coupled by means of a glass rod into a second length of lightguide fiber which carries the light into a photodetector separated from the light bulb. The intensity of the stray light radiated by the light bulb, which is proportional to the total irradiance of the bulb, is sensed by the detector. The voltage supplied to the light bulb is regulated in accordance with the detector output signal so that the intensity of the light radiated by the bulb is kept substantially constant.

The advantage of the present invention is that it relies on the stray light radiated by the bulb in order to regulate its excitation and thereby control the intensity of the light radiated by the bulb onto the object to be illuminated. Since the stray light would not otherwise enter the first lightguide fiber and thus be transmitted to the object, the illumination of the object is not adversely affected. In contrast, the use of prior art techniques, such as the use of a beam splitter, to couple light from the bulb to the detector would likely diminish the intensity of the light coupled into the first fiber, and hence, the intensity of the light illuminating the object. Further, by coupling light to the photodetector from the light bulb by the combination of a glass rod and a length of fiber, the photodetector can thus be separated from the light bulb, avoiding undue thermal heating which would adversely affect detector operation.

DETAILED DESCRIPTION

Figure 1:
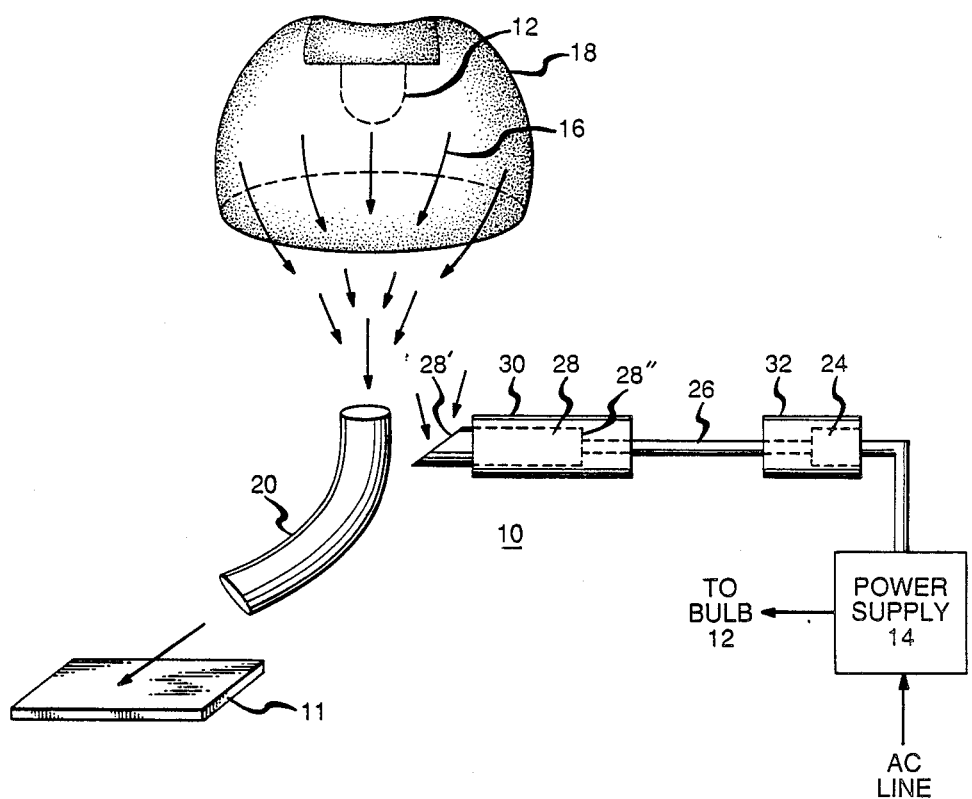
FIG. 1 shows a block diagram of an illumination source in accordance with a preferred embodiment of the invention.

FIG. 1 illustrates a block diagram of an illumination source 10 in accordance with the present invention for illuminating an object 11 (shown as a circuit board) with light of substantially constant intensity. The illumination source 10 comprises an electric light bulb 12 which is excited with DC voltage from an adjustable voltage power supply 14 powered from an AC line. The details of the power supply 14 will be described in greater detail with respect to FIG. 2.

When excited by the power supply 14, the light bulb 12 produces light 16, a major portion of which is focused by a mirror 18 (typically integral with the bulb), and associated optics (not shown), into one end of a lightguide fiber 20. The opposite end of the fiber 20 is directed at the object 11 so the object is illuminated with light carried by the fiber from the bulb 12. In many applications, especially those involving automated inspection of the object 11, the intensity of the light must be maintained substantially constant. Variations in the AC voltage and aging of the light bulb 12 can adversely affect the intensity of the light 16 which is generally undesirable.

To enable the intensity of the light 16 to be maintained substantially constant, the illuminator 10 includes a light intensity detector 24, which, in a preferred embodiment, takes the form of a photodiode, for sensing the intensity of the light radiated by the light bulb 12. As will be described later with respect to the operation of the power supply 14, the output signal of the photodiode 24, which varies with the intensity of the light 16, controls the output voltage supplied by the power supply to the light bulb 12. By controlling the output voltage of the power supply 14 in accordance with the output signal of the photodiode 24, the intensity of the light 16 produced by the light bulb 12 can be maintained substantially constant.

In accordance with the invention, the photodiode 24 is not positioned directly adjacent to the bulb 12 for sensing the intensity of the light 16. Rather, the photodiode 24 is physically spaced from the bulb 12 by a length of lightguide fiber 26 which serves to carry a portion of the light 16 to the photodiode 24. To avoid adversely affecting the illumination of the object 11 by sampling that portion of the light 16 coupled into the fiber 20, stray light, that is, the light which otherwise does not enter the fiber 20, is coupled into the fiber 26. The intensity of the stray light is directly proportional to the total intensity of the light 16 so that by coupling the stray light to the photodiode 24, a good measure of the intensity of the light can be obtained.

To couple the stray light into the fiber 26, a glass rod 28 has a first end 28' positioned adjacent to the bulb 12 to receive the stray light. In a preferred embodiment, the rod end 28' is cut at a 45° angle to maximize the amount of stray light entering the rod 28. The rod has its opposite end 28" ground flat and abutted with a first end of the fiber 26. A first aluminum sleeve 30 rigidly holds the first end of the fiber 26 in abutment with the rod end 28" while a second sleeve 32 rigidly holds the opposite end of the fiber in abutment with the photodiode 24. The sleeves 30 and 32 keep the fiber 26 rigidly coupled to the rod 28 and the photodiode 24, respectively, to avoid any light losses due to loose coupling.

It would be possible to omit the glass rod 28 and simply position the first end of the fiber 26 so that the stray light enters it directly. However, there are several distinct advantages in employing the glass rod 28 to couple the stray light into the fiber 26. First, the glass rod 28 shields the fiber 26 from excess heat, which is especially important if the fiber is fabricated from a heat-sensitive material, such as plastic. Secondly, coupling the first end of the fiber 26 to the glass rod 28 eliminates dust occlusion thereat, which would adversely affect the intensity of the light coupled by the fiber to the photodiode 24. Although the rod end 28' is described as being cut at a 45° angle, the end could be cut flat, provided that the rod were positioned differently than shown in FIG. 1.

Coupling the light 16 from the bulb 12 to the photodiode 24 by the combination of the glass rod 28 and the fiber 26 affords the advantage that the diode can be physically separated from the bulb, and thus be thermally isolated. Thermal runaway of the photodiode 24, which might otherwise occur if the diode were positioned adjacent to the bulb 12, is thereby avoided. Additionally, since the rod 28 couples the stray light 16 into the fiber 26 (which light would not have otherwise entered the fiber 20), there is substantially no diminution in the illumination of the object 11. In comparison, the use of prior art coupling techniques, which rely on sampling of the light coupled into the fiber 20, would likely reduce the amount of light entering the fiber and thereby diminish the illumination of the object 11.

Figure 2:
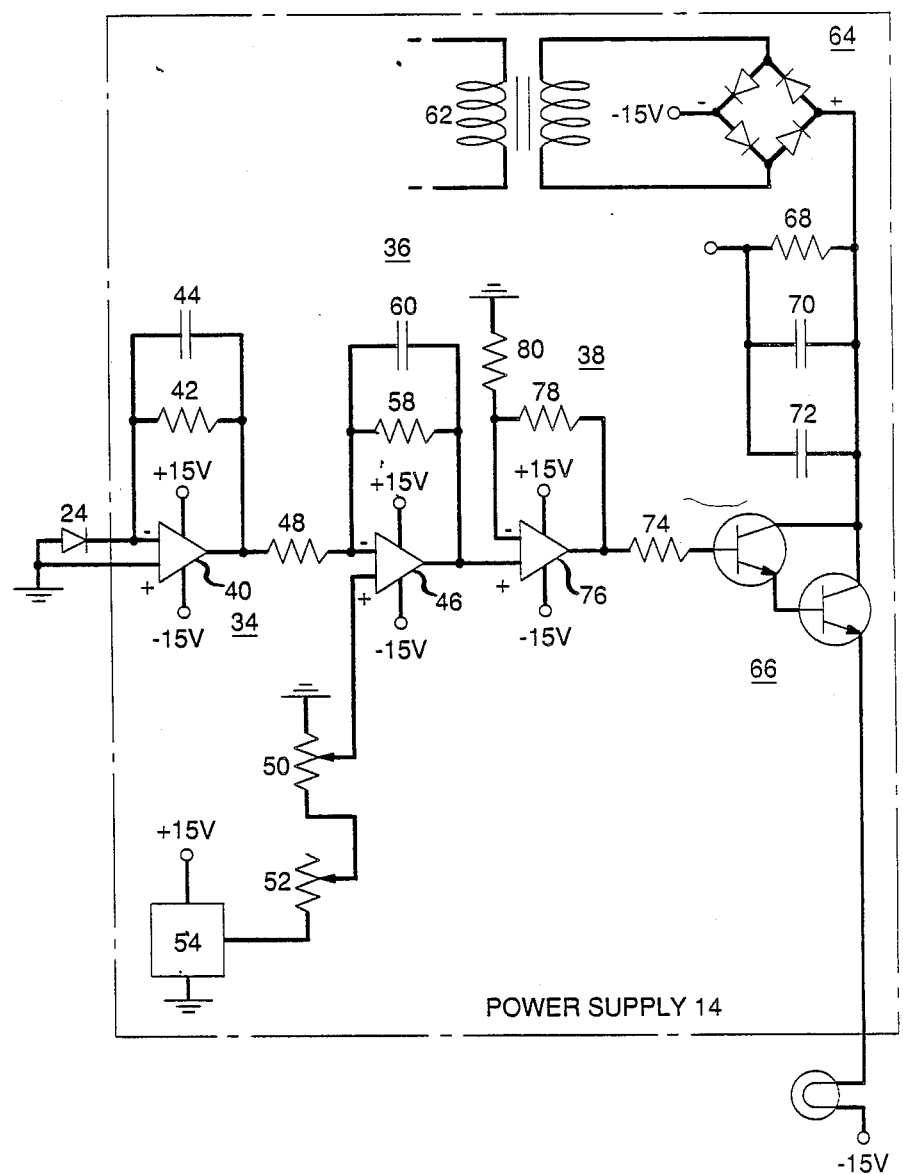
FIG. 2 is a block schematic diagram of a regulator circuit within the illumination source of FIG. 1.

Referring to FIG. 2, there is shown a schematic drawing of the power supply 14 which excites the light bulb 12. The power supply 14 comprises a sensor amplifying stage 34, an error signal generating stage 36 and a power driver stage 38. The sensor amplifying stage 34 serves to amplify the signal from the photodiode 24. To this end, the stage 34 includes a field effect operational amplifier 40 which has an invert input, and a grounded non-invert input, coupled to the cathode and anode, respectively, of the photodiode 24. The amplifier 40 has its positive and negative power inputs supplied with +15v DC and −15v DC, respectively, from a 15 volt regulated DC supply (not shown). A resistor 42 is coupled between the invert input and the output of the amplifier 40 to control its gain. Shunting the resistor 42 is a capacitor 44 which serves to prevent oscillation and slow the response of the amplifier 40 in order to compensate for the relatively slow response of the light bulb 12.

The error signal generating stage 36 serves to generate an error signal in accordance with the difference between the output signal of the photodiode 24, as amplified by the amplifier 40, and a fixed voltage. To accomplish this function, the stage 36 includes a bipolar operational amplifier 46 which has its invert input coupled via a resistor 48 to the output of the amplifier 40. The non-invert input of the amplifier 46 is coupled to the wiper arm of a potentiometer 50 whose fixed resistance portion is connected in series with a trimmer resistor 52 between the output of a regulator circuit 54 and circuit ground. The regulator circuit 54, typically a model AD 586 circuit, has its inputs coupled to the +15v DC regulated supply terminal and ground, respectively, and provides a precise level of voltage across the potentiometer 50 and the trimmer resistor 52. By adjusting the potentiometer 50, the fraction of the voltage produced by the regulator 54 which passes into the non-invert input of the amplifier 46 can be varied.

The amplifier 46, like the amplifier 40, has its positive and negative power input supplied with +15v DC and −15v DC. A resistor 58 shunts the invert input and the output of the amplifier 46 to control its gain. The resistor 58 is shunted by a capacitor 60, which serves to slow the response of the amplifier 46 in exactly the same manner that the capacitor 42 slows the response of the amplifier 40.

The power driver stage 38 supplies a voltage to the light bulb 12 in accordance with the output signal of the amplifier 46, which varies with the difference in magnitude between the signal from the photodiode 24, and the fixed voltage established by the potentiometer 50. To accomplish this task, the stage 38 includes a step-down transformer 62 whose primary is coupled to an AC line. The secondary of the transformer 62 is coupled to the input of a full-wave diode bridge 64 which has its negative output terminal supplied with −15v DC from the regulated supply. The positive output terminal of the bridge 64 is coupled to the collector of a Darlington transistor pair 66. The parallel combination of a resistor 68, and a pair of capacitors 70 and 72, is coupled between −15v DC and the junction between the bridge 64 and the Darlington transistor pair 66 to filter the voltage supplied to the transistor pair from the bridge.

The Darlington transistor pair 66 has its emitter coupled to one terminal of the light bulb 12 whose remaining terminal is supplied with −15v DC from the regulated supply. The base of the Darlington transistor pair 66 is coupled through a resistor 74 to the output of an operational amplifier 76, which like the amplifiers 40 and 46, has its positive and negative power terminals supplied with +15v DC and −15v DC, respectively, from the regulated supply. The amplifier 76 has its invert input coupled to the junction between a pair of resistors 78 and 80 coupled in series between the output of the amplifier 76 and ground. The non-invert input to the amplifier 76 is coupled directly to the output of the amplifier 46.

During the operation of the power supply 14, the output signal of the photodiode 24 is amplified by the amplifier 40 and then input to the amplifier 46 which also receives a reference voltage from the potentiometer 50. The amplifier 46 supplies a signal to the amplifier 76 which varies with the difference in magnitude between the signal of the photodiode 24 and the reference voltage. The amplifier 76 drives the Darlington pair 66 in accordance with the strength of the input signal to the amplifier.

The level of the reference voltage from the potentiometer 50 into the amplifier 46 is adjusted to indicate the desired intensity of the light 16 to be radiated by the light bulb 12. As the difference between the actual light intensity (measured by the photodetector 24) and the desired light intensity (represented by the voltage from the potentiometer 50) increases, so does the base current into the Darlington pair 66. As a result, the level of the excitation of the light bulb 12 increases, causing the intensity of the light 16 to increase. Once the intensity of the light 16 increases, the difference between the output signal of the photodetector 24 and the reference voltage decreases, causing the output signal of the amplifier 76 to become weaker. Ultimately, the intensity of the light 16 will, under steady state conditions, reach the desired intensity, as established by the level of the reference voltage determined by the setting of the potentiometer 50.

The foregoing describes an improved illumination source 10 which provides light 16 of substantially uniform intensity. It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for illuminating an object with light of substantially constant intensity, comprising the steps of:
   supplying a dc voltage from a dc supply through an electronic regulator to an electric light bulb to excite the bulb so that it radiates light;
   directing at least a major portion of the light radiated by the bulb onto an object to be illuminated;
   coupling at least a portion of the light radiated by the light bulb through a length of lightguide fiber to a detector physically spaced from the bulb;
   sensing, at the detector, the intensity of the light radiated by the light bulb and generating an intensity signal which varies accordingly;
   comparing the intensity signal to a reference voltage representative of a desired light intensity value and generating an error signal which varies in direct proportion with the difference between the reference voltage and the intensity signal; and
   supplying the error signal to the electronic regulator which passes a greater or lesser amount of dc voltage from the dc supply to the light bulb in direct response to whether the error signal is positive or negative, the amount of the voltage increase or decrease varying with the magnitude of the error signal.

2. The method according to claim 1 wherein the step of coupling at least a portion of light into the lightguide fiber comprises the steps of:
   positioning one end of a glass rod adjacent to the light bulb so that at least a portion of the stray light radiated by the bulb, that is, the light not otherwise directed onto the object, enters the rod; and
   abutting the opposite end of the glass rod to one end of the lightguide fiber so that the light entering the rod passes into the fiber for transmission to the detector.

3. The invention according to claim 1 wherein the major portion of the light radiated by the light bulb is directed towards the object by transmitting the light through a second lightguide fiber having a first end adjacent to the bulb and a second end directed at the object.

4. In combination with a method of fabricating an object including the steps of:
   performing at least one fabrication operation; and
   inspecting the object for defects, if any, by:
   illuminating the object;
   capturing the image of the object; and
   processing the captured image to detect if defects are present, the improvement comprising illuminating the object with light of substantially constant intensity by the steps of:
   supplying a dc voltage from a dc supply through an electronic regulator to an electric light bulb to excite the bulb so it radiates light;
   directing at least a major portion of the light radiated by the bulb onto the object to be illuminated;
   coupling at least a portion of the light radiated by the light bulb through a length of lightguide fiber to a detector physically spaced from the bulb;
   sensing, at the detector, the intensity of the light radiated by the light bulb and generating an intensity signal which varies accordingly;
   comparing the intensity signal to a reference voltage representative of a desired light intensity value and generating an error signal which varies in direct proportion with the difference between the reference voltage and the intensity signal; and
   supplying the error signal to the electronic regulator which passes a greater or lesser amount of dc voltage from the dc supply to the light bulb in direct response to whether the error signal is positive or negative, the amount of the voltage increase or decrease varying with the magnitude of the error signal.

5. The method according to claim 4 wherein the step of coupling at least a portion of light into the lightguide fiber comprises the steps of:
   positioning one end of a glass rod, which is cut at approximately a 45° angle, adjacent to the light bulb so that at least a portion of the light radiated by the bulb enters the rod; and
   abutting the opposite end of the glass rod, which is ground flat, to one end of the lightguide fiber so that the light entering the rod passes into the fiber for transmission to the detector.

6. The method according to claim 1 wherein the light radiated by the light bulb is directed towards the object by transmitting the major portion of the light through a second lightguide fiber having a first end adjacent to the bulb and a second end directed at the object.

7. Apparatus for illuminating an object with light of substantially constant intensity comprising:

an electric light bulb;

a photodetector physically separated from the light bulb for generating an intensity signal which varies in accordance with the intensity of the light striking the detector;

a lightguide fiber for carrying light from the bulb to the photodetector;

means for coupling light from the bulb into the lightguide fiber;

a dc power supply for supplying a dc voltage; and an electronic regulator circuit responsive to the intensity signal of the photodetector for controlling the magnitude of the dc voltage supplied from the dc supply to the bulb so that the intensity of the light radiated by the bulb is kept substantially constant.

8. The apparatus according to claim 7 wherein the means for coupling the light into the lightguide fiber comprises a glass rod, having a first end which is cut at approximately a 45° so at least a portion of the light from the bulb enters the rod, and a second end abutting an end of the lightguide fiber.

9. The apparatus according to claim 7 wherein the electronic regulator comprises:

an optical sensing stage for amplifying the intensity signal produced by the photodetector;

an error signal generating stage for producing an error signal varying in accordance with the difference between the amplified intensity signal of the photodetector, and an adjustable reference voltage, representing the desired intensity of the light to be radiated by the bulb; and a Darlington transistor pair for varying the dc voltage supplied from the dc supply to the light bulb in accordance with the error signal.

* * * * *